United States Patent [19]

Schmid et al.

[11] 4,305,249

[45] Dec. 15, 1981

[54] MULTICYLINDER INTERNAL COMBUSTION ENGINE, ESPECIALLY FOR AUTOMOBILES AND METHOD OF OPERATING SAME

[75] Inventors: Wolfgang Schmid, Markgröningen; Klaus Schellmann, Hemmingen, both of Fed. Rep. of Germany

[73] Assignee: Dr. Ing. H.c.F. Porsche Aktiengesellschaft, Stuttgart, Fed. Rep. of Germany

[21] Appl. No.: 90,613

[22] Filed: Nov. 2, 1979

[30] Foreign Application Priority Data

Jan. 3, 1979 [DE] Fed. Rep. of Germany ....... 2907934

[51] Int. Cl.³ .......................... F01N 3/20; F02D 17/00
[52] U.S. Cl. ...................................... 60/274; 60/276; 60/301; 123/198 F; 261/23 A
[58] Field of Search .................. 60/274, 276, 285, 301; 123/198 F, 52 M; 261/23 A

[56] References Cited

U.S. PATENT DOCUMENTS

| | | | |
|---|---|---|---|
| 3,708,980 | 1/1973 | Truxell | 60/301 |
| 3,939,654 | 2/1976 | Creps | 60/285 |
| 4,076,003 | 2/1978 | Garabedian | 261/23 A |
| 4,107,921 | 8/1978 | Iizuka | 123/198 F |
| 4,186,715 | 2/1980 | Iizuka | 123/198 F |
| 4,204,514 | 5/1980 | Ishida | 123/198 F |
| 4,245,471 | 1/1981 | Sugasawa | 60/301 |

FOREIGN PATENT DOCUMENTS 2627286 12/1977 Fed. Rep. of Germany ........ 60/301

Primary Examiner—Douglas Hart
Attorney, Agent, or Firm—Craig and Antonelli

[57] ABSTRACT

A multicylinder internal combustion engine is provided with fuel-air mixture feed devices associated with two different cylinders or groups of cylinders, and an exhaust conduit system in which two catalyzers are disposed, one downstream of the other. The exhaust produced by the first group of cylinders impinges on both catalyzers, while the exhaust of the second group of cylinders is fed through only the second catalyzer. During a predetermined partial load range, fuel is supplied only to one of the cylinder groups, while both cylinder groups are fed with fuel once this load range is exceeded. In a preferred embodiment, the turning on of fuel to the second cylinder group is effectuated by a cam disk that also serves the function of simultaneously controlling the supply of air through throttle valves to the respective cylinder groups.

13 Claims, 3 Drawing Figures

MULTICYLINDER INTERNAL COMBUSTION ENGINE, ESPECIALLY FOR AUTOMOBILES AND METHOD OF OPERATING SAME

BACKGROUND AND SUMMARY OF THE INVENTION

The invention relates to a multicylinder internal combustion engine, especially for automobiles, with fuel-air mixture feed devices associated with two different cylinders or groups of cylinders, and an exhaust conduit system in which two catalyzers are disposed one downstream of the other, associated with the cylinder groups in such a way that the exhaust of a first group of cylinders impinges on both catalyzers, and the exhaust of a second group of cylinders is taken to the exhaust system upstream of the second catalyzer.

In a known multicylinder internal combustion engine of the type in question, one cylinder group is supplied by a carburetor with a rich fuel-air mixture and the other group of cylinders is supplied by a carburetor with a lean fuel-air mixture (U.S. Pat. No. 3,798,980). By this mixture regulation, the exhaust emission is improved, as opposed to that of an internal combustion engine in which the mixture composition is adapted to the engine's torque requirement, e.g. in such a way that the mixture composition is richer as a function of torque or power requirement (German AS No. 1,121,202), but the improvement is not sufficient to meet the requirements of anticipated legal regulations.

To improve the exhaust emission of internal combustion engines, a switching arrangement is likewise known for regulation of the air-fuel mixture delivered to the engine, by means of an oxygen measuring sensor disposed in the exhaust flow of the internal combustion engine (German OS No. 2,554,988), which produces an electric switching signal to the control device of a fuel injection system, as a function of the composition of the exhaust that results from combustion of the fuel-air mixture. In this way the fuel-air mixture can be adjusted to produce an exhaust that is as free of harmful materials as possible on a specific ratio, e.g. a stoichiometric relationship with the air index $R=1$. These oxygen measuring sensors have the advantage that they give a clear reliable adjustment signal in transition from a superstoichiometric to a substoichiometric composition of the exhaust at air index $R=1$ and vice versa. However, such oxygen measuring sensors in the hot-running phase of the internal combustion engine are without effect on the reaching of the response temperature of the catalyzers, which are also necessary here to satisfy expected legal requirements.

To prevent power losses, and to effect a saving of fuel, in multicylinder internal combustion engines with a plurality of carburetors or subdivided carburetors for feed to the cylinders by groups via separate mixture conduits, by changing fuel delivery as a function of power output of the internal combustion engine, an intermittent regulation is undertaken so that one or more groups of cylinders remain without delivery of fuel (German Pat. No. 838,518). Exhaust emission remains essentially unaffected, however, in this method for intermittent regulation in multicylinder internal combustion engines.

The present invention is concerned with solving the problem of creating an internal combustion engine of the type in question that combines the advantages of the described internal combustion engines and substantially avoids their drawbacks.

This problem is solved according to a preferred embodiment of the invention in that the fuel supply to the fuel-air mixture feed device can be switched off for the second group of cylinders, as a function of the load of the internal combustion engine. The cylinder group that can switch off is associated with the second of two catalyzers. Upstream of the first catalyzer, there is an oxygen measuring sensor, and upstream of the second catalyzer, downstream of the supply of exhaust of the second group of cylinders, there is an oxygen measuring sensor. When the second group of cylinders is switched off, it receives only air, upstream of the fuel-air mixture feed device. The exhaust pipes of the first group of cylinders are combined upstream of the oxygen measuring sensor that is upstream of the first catalyzer, to form a single exhaust pipe, and the exhaust pipes of the second group of cylinders are combined to form a single exhaust pipe, upstream of the oxygen measuring sensor that is upstream of the second catalyzer, together with the exhaust discharge pipe of the first catalyzer. In idling of the internal combustion engine, a fuel-air mixture is supplied to the first group of cylinders and the second group of cylinders receives air. It has been found to be especially advantageous that, from the idling mode up to the end of a predetermined partial load range of the internal combustion engine, the quantity of fuel-air mixture supplied to the first group of cylinders is continuosly increased, and the amount of air delivered to the second group of cylinders is increased continuously in a first part of this partial load range, and then continuously reduced to practically zero in the remaining part of the partial load range. After passing through the predetermined partial load range of the internal combustion engine, fuel-air mixture is also fed to the second group of cylinders. It has further been found to be advantageous that, after passing through the predetermined partial load range of the internal combustion engine, the amount of fuel-air mixture fed to the first group of cylinders is continuously reduced and the amount of fuel-air mixture fed to the second group of cylinders is continuously increased, until the fuel-air mixture quantities will be the same for both groups of cylinders, and the fuel-air mixture quantities for both groups of cylinders then can be increased continuously by the same amount, up to full load. After passing through the predetermined partial load range of the internal combustion engine, the continuous reduction of the amount of fuel-air mixture fed to the first group of cylinders occurs continuously, to a lesser degree than the continuous increase in the amount of fuel-air mixture fed to the second group of cylinders.

The arrangement of the two catalyzers one downstream of the other, and the separate regulation of the two groups of cylinders by their respective oxygen measuring sensors makes possible an optimal decontamination of the exhaust of both groups of cylinders, in all ranges of operation and in all operating conditions of the internal combustion engine, with retention of the advantages of fuel saving and prevention of power losses. If the internal combustion engine works with only the first group of cylinders, then all exhaust components in the exhaust of this group of cylinders are partly decontaminated by simultaneous oxidation and reduction in the first catalyzer. The second group of cylinders in this operational state of the engine works as an air pump because of the air that is fed to this group of cylinders, so that this air is fed to the exhaust of first group of cylinders upstream of the second catalyzer, and thus there is a supplementary oxidation of the exhaust from the first group of cylinders in the second catalyzer. In this way the carbon monoxide and hydrocarbons in this exhaust are still further reduced. At the same time the oxygen measuring sensor and the catalyzer of the second group of cylinders are preheated by the exhaust of the first cylinder group, in case they have not yet reached their operational temperature, so that when the second group of cylinders is switched in, its exhaust decontaminating system is immediately ready to function.

If both groups of cylinders are working, the mixture of exhaust gases from the first and second groups of cylinders is measured by the oxygen measuring sensor upstream of the second catalyzer, and the composition of the fuel-air mixture for the second group of cylinders is so controlled that the exhaust composition at the oxygen measuring sensor upstream of the second catalyzer will correspond to a fuel-air mixture composition for the two groups of cylinders with an air index of R=1. Thus, defects in the fuel-air mixture composition for the first group of cylinders would be taken into account by the composition of the fuel-air mixture of the second group of cylinders. In this operational state of the internal combustion engine, there is moreover oxidation and reduction of the exhaust from the first cylinder group, as well as of that of the second group.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
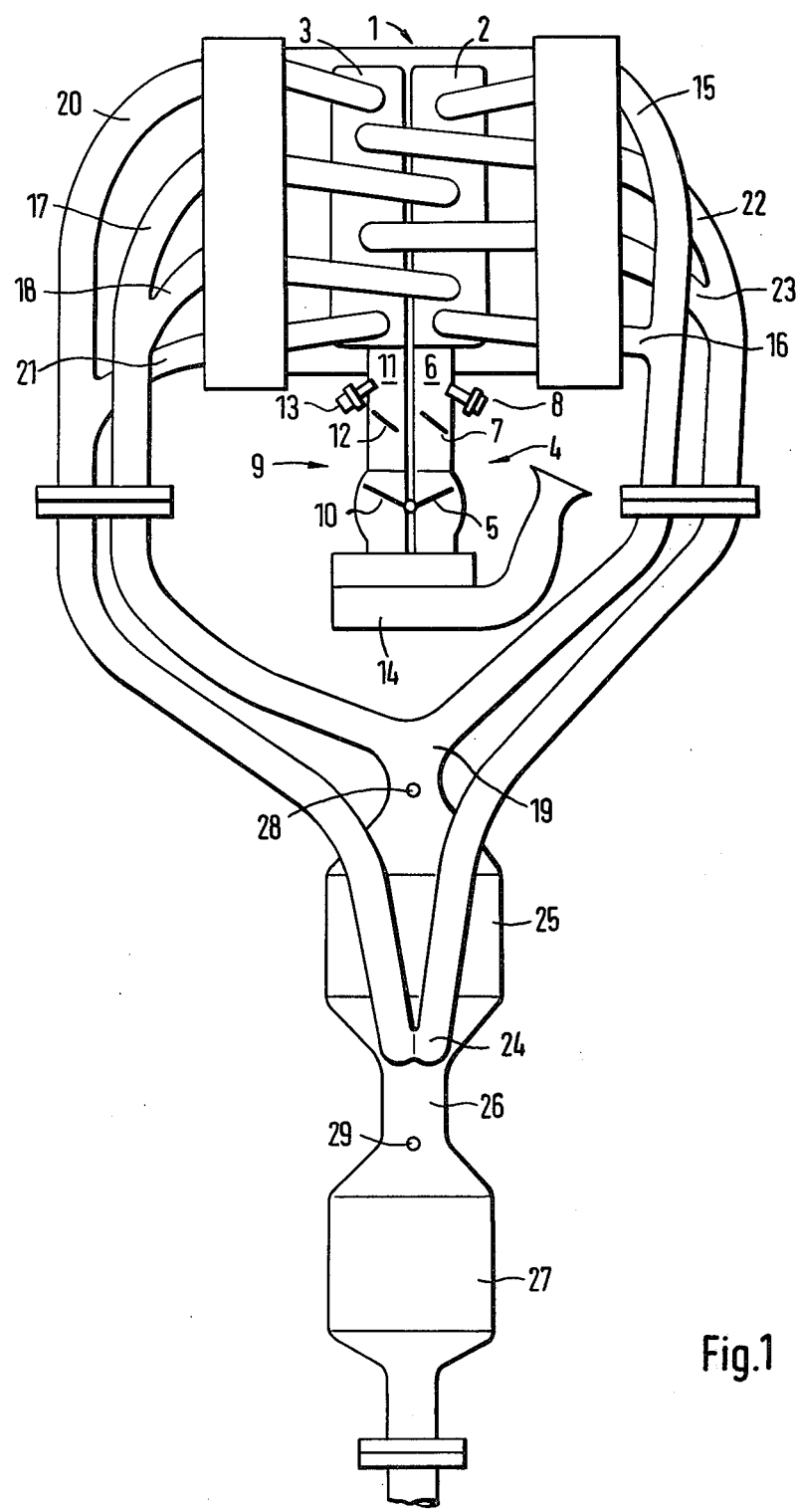
FIG. 1 shows an eight-cylinder internal combustion engine with an exhaust conduit system.

In FIG. 1, numeral 1 designates an eight-cylinder internal combustion engine that is divided into a first group of cylinders 2 and a second cylinder group 3, with four cylinders each. A fuel-air mixture feed device 4 is associated with cylinder group 2, formed by an air quantity measuring device 5, a throttle valve 7 disposed in a suction pipe 6 which can be acted on by the pedal that is not shown, and a fuel injection nozzle 8. A fuel-air mixture feed device 9 is associated with cylinder group 3, comprising a device for measuring the air quantity 10, a throttle valve 12 disposed in a suction pipe 11 and acted on by the gas pedal that is not illustrated, and a fuel injection nozzle 13. An air filter is designated 14. Such fuel-air mixture feed devices are known per se.

The exhaust from cylinder group 2 is taken to exhaust pipes 15, 16, 17 and 18 that are combined to form a single exhaust pipe 19, and exhaust from cylinder group 3 is taken to pipes 20, 21, 22 and 23 that are brought together as a single exhaust pipe 24, with an exhaust discharge pipe 26 of a catalyzer 25. The single exhaust pipe 19 opens into catalyzer 25, catalyzer 25 being connected with another catalyzer 27 via exhaust discharge pipe 26.

In the single exhaust pipe 19, upstream of catalyzer 25, there is an oxygen measuring sensor 28, and in exhaust discharge pipe 26 there is an oxygen measuring sensor 29, and exhaust pipes 20, 21, 22 and 23 empty into exhaust discharge pipe 26 upstream of oxygen measuring sensor 29.

Figure 2:
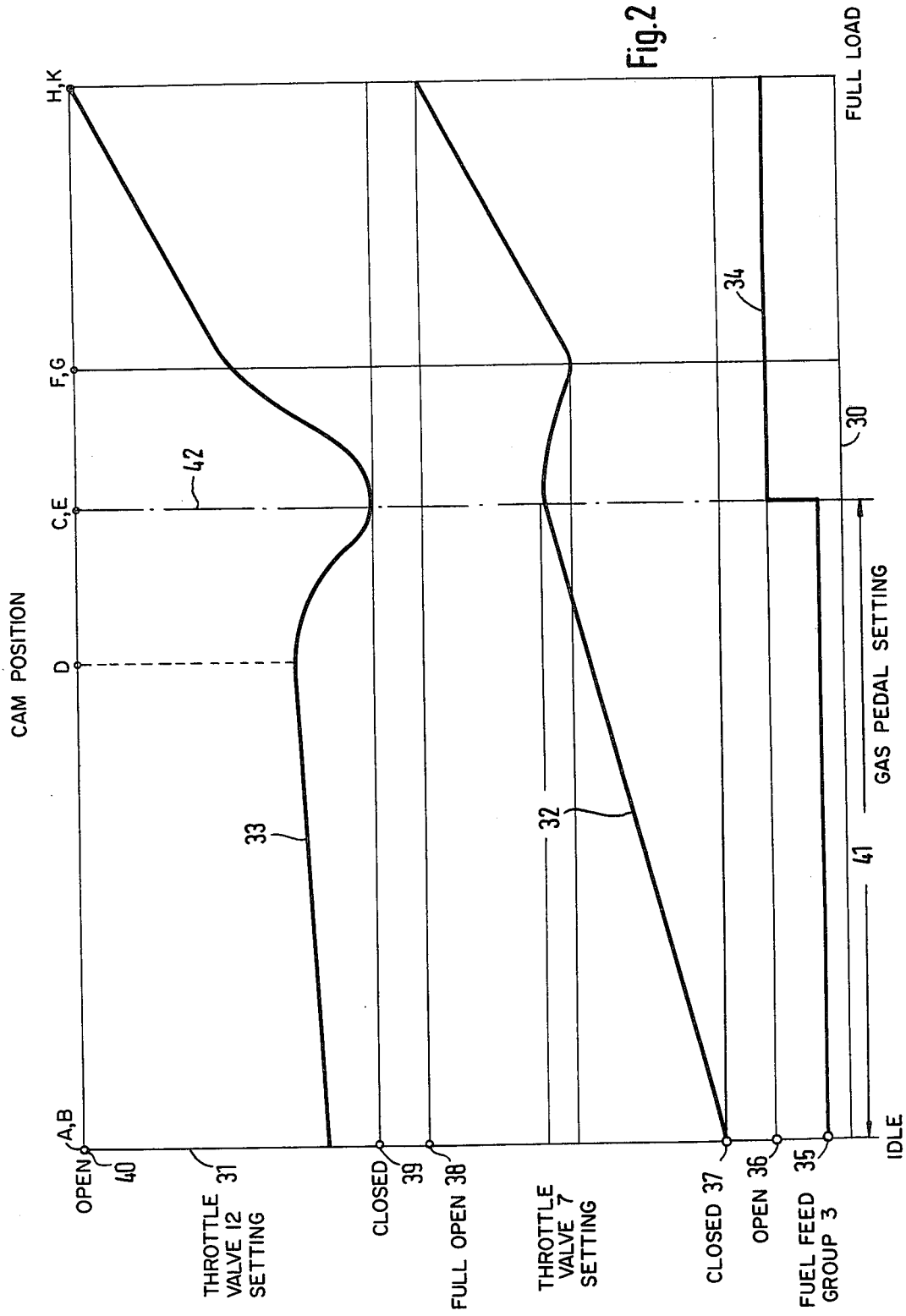
FIG. 2 shows the fuel-air mixture or air-delivery for the groups of cylinders of the internal combustion engine, with reference to a control diagram.

In FIG. 2, with reference to a control diagram, the delivery of fuel-air mixture or air is shown. This can occur by means of a cam plate or slide plate or the like (a preferred embodiment for which is described below in connection with FIG. 3). The pedal setting is shown on abscissa 30, and the settings of the throttle valve are on ordinate 31. Curve 32 represents cylinder group 2, and curve 33 represents cylinder group 3. Line 34 shows fuel feed for cylinder group 3. On ordinate 31, point 35 symbolizes the state of interrupted fuel feed, and point 36 the state of open fuel feed for cylinder group 3. Point 37 shows the setting of the closed throttle valve 5 of cylinder group 2, and point 38 shows its setting when it is open. Point 39 shows the setting of the closed throttle valve 10 of cylinder group 3 and point 40 shows the setting of opened valve 10. The end of a predetermined partial load range 41 is indicated by a dot-and-dash line 42.

After the internal combustion engine has been put into operation, cylinder group 2 runs with closed throttle valve 5 in idling, and cylinder group 3 receives air, with throttle valve 10 slightly open and the fuel feed cut off, so that it acts as an air pump. The exhaust from cylinder group 2 is first taken to catalyzer 25 and there it is partly decontaminated by simultaneous oxidation and reduction, and it is then taken to catalyzer 27 in which because of the air from cylinder group 3 there is a supplementary oxidation of this exhaust. This exhaust also preheats oxygen measuring sensor 29 and catalyzer 27, insofar as they have not reached their operational temperature.

From idling up to the end of the rated partial load range 41 of internal combustion engine 1, the amount of fuel-air mixture delivered to the first group of cylinders 2 is continuously increased, and the amount of air delivered to the second cylinder group 3 in the first part of this partial load range is continuously increased, and in the remaining part of the partial load range that follows the first, it is continuously reduced, to an amount that is practically zero. Up to the end of this predetermined partial load range, cylinder group 3 acts as an air pump.

When the end of this partial load range of the internal combustion engine is reached, the fuel feed for cylinder group 3 is switched on (line 34), so that this group of cylinders likewise receives the fuel-air mixture. After passing through this partial load range of the internal combustion engine, the amount of fuel-air mixtures supplied to first cylinder group 2 is continuously diminished, and the amount of fuel-air mixture supplied to second cylinder group 3 is continuously increased, until the fuel-air mixture quantities for both cylinder groups 2 and 3 are equal. Thereafter, the fuel-air mixure for both groups 2 and 3 is continuously increased by the same amount, up to full load.

In the present example of a preferred embodiment of the invention, after passing through the predetermined partial load range of combustion engine 1, the continuous reduction of the amount of fuel-air mixture fed to first cylinder group 2 occurs to a lesser degree than the continuous increase of the fuel-air mixture delivered to second cylinder group 3. Fuel-air mixture feed device 4 is influenced by oxygen measuring sensor 28 that is impinged upon by exhaust from cylinder group 2, and the fuel-air mixture feed device 9 is influenced by oxygen measuring sensor 29 that is impinged upon by the exhaust of cylinder group 2 and cylinder group 3, corresponding to the exhaust composition that optimizes exhaust emission.

Figure 3:
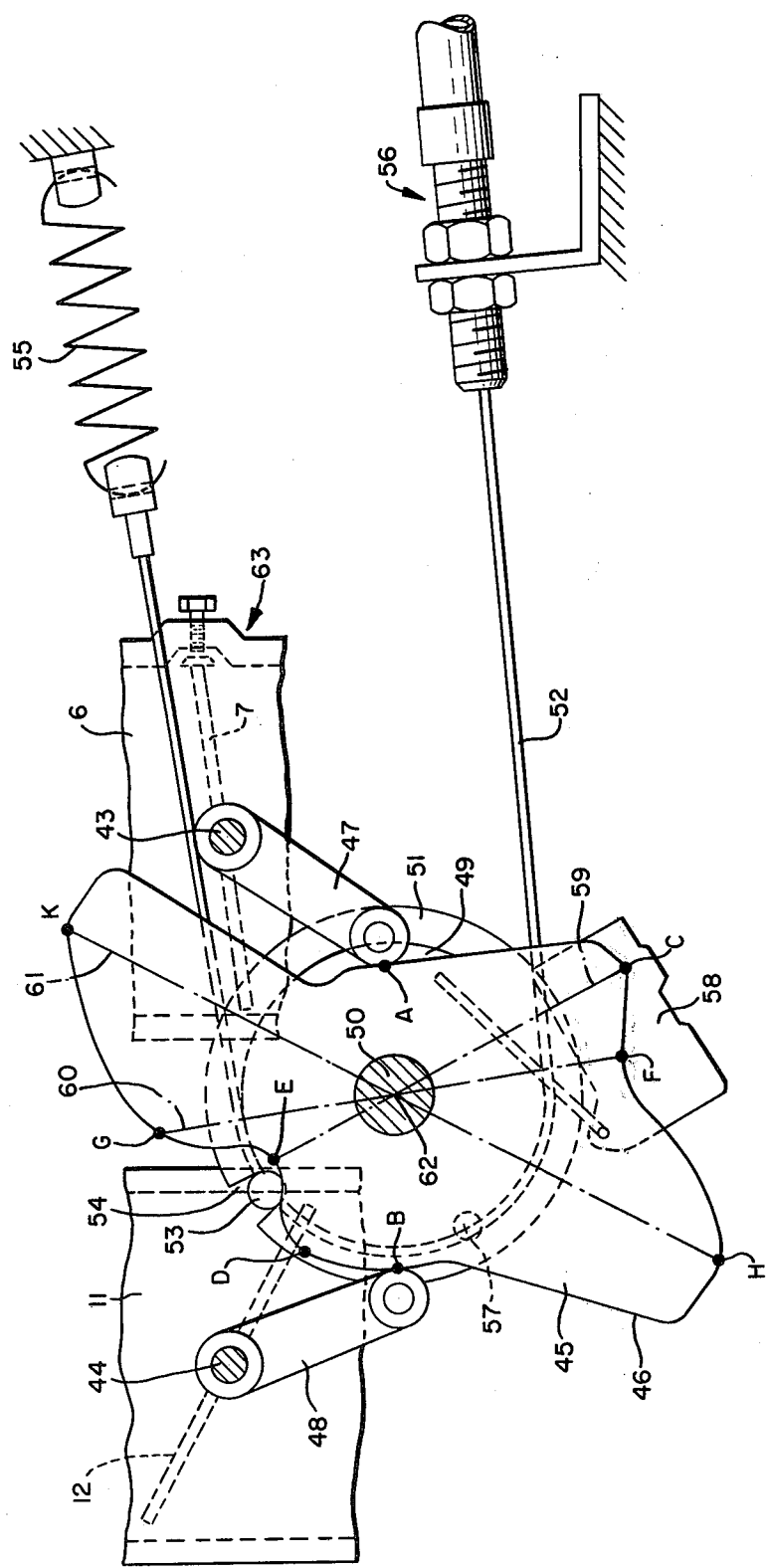
FIG. 3 shows the feeding of fuel-air mixture and/or air to the cylinder groups of the internal combustion engine, which feeding is controlled by a cam disk.

Turning now to FIG. 3, the intake manifolds 6 and 11 with the throttle valves 7 and 12 arranged on throttle valve shafts 43 and 44, respectively, are shown with an arrangement for turning the throttle valves under the control of a cam disk 45. A pivot lever 47 mounted on the throttle valve shaft 43 for rotation therewith and a pivot lever 48 mounted on the throttle valve shaft 44 for rotation therewith slide along the outline 46 of the cam. The cam disk 45 is arranged, together with a guide disk 49, on a shaft 50 for joint rotation therewith. The guide disk comprises a continuous groove 51 in which a gas pull cable 52 is conducted. A roller 53 is fixedly joined to the gas pull cable 52 and is arranged, to be secure against displacement, in an axial groove 54 on the periphery of the guide disk.

On one end, the gas pull cable is connected to a restoring spring 55 and with the other end, guided in an adjusting means 56, the gas pull cable is connected to the gas pedal, not shown. Depressing of the gas pedal pulls the cable 52 against the force of spring 55 so as to rotate cam disk 45 in a counter-clockwise manner since relative movement between cable 52 and disk 45 is precluded by cable connected roller 53 being lodged in groove 54. A control cam 57 is arranged at the cam disk 45 and cooperates with an electric switch 58.

Control points on the cam path of the cam disk are denoted by A, B, C, D, E, F, G, H, and K, wherein control points C and E are arranged on a common control plate 59, the control points F and G are arranged on a common control plate 60, and the control points H and K are disposed on a common control plate 61. The control planes 59, 60, and 61 extend through the axis of rotation 62 of the cam disk 45. An idling adjustment means is denoted by 63.

The operation of the cam throttle valve adjustments will now be described with particular reference to the control points A–H and K shown in FIGS. 2 and 3.

During idling of the internal combustion engine, the control lever 47 of the first cylinder group 2 is located at a control point A of the cam path 46, whereby the throttle valve 7 is closed and the first cylinder group 2 is fed, via the idling adjustment device 63, with air for the idling fuel-air mixture. The control lever 48 of the second cylinder group 3 is located at a control point B of the cam path 46, whereby the throttle valve 12 is opened to a minor extent, so that air is fed to the second cylinder group 3 when the fuel feed has been shut off.

From idling operation up to the end of a predetermined partial load range of the internal combustion engine, the cam disk 45 slides along, on the one hand, with its cam path 46, on the control lever 47 of the first cylinder group 2 up to a control point C; during this step, the amount of fuel-air mixture supplied to the first cylinder group 2 is continuously increased. On the other hand, the cam disk slides, with its cam path 46, along the control lever 48 of the second cylinder group 3, initially up to a control point D symbolizing the end of the first part of the predetermined partial load range, up to which point the amount of air fed to the second cylinder group 3 is continuously increased, and thereafter up to a control point E symbolizing the end of the predetermined partial load range, up to which point the amount of air is continuously reduced until the air quantity approximates zero.

By means of the control cam 57 arranged on the cam disk 45, the switch 58 for the fuel feed to the second cylinder group 3 is simultaneously actuated (from the closed fuel feed level 35 to the open feed level 36) upon reaching the control points C and E arranged on a common control plane 59 extending through the axis of rotation of the cam disk 45. In an examplary embodiment of the invention, this is achieved by the additional insertion of electromagnetic injection valves, as they are utilized, for example, in the fuel injection systems "L-Jetronic" of Bosch (Bosch Technishe Unterrichtung Benzineinspritzung D- and L-Jetronic 1975).

From control point C, the cam disk 45 slides with its cam path 46, on the one hand, along the control lever 47 of the first cylinder group 2 up to a control point F and, on the other hand, with is cam path 46 along the control lever 48 of the second cylinder group 3 up to a control point G arranged with control point F on a common control plane 60 extending through the axis of rotation 62 of the cam disk 45; the amount of fuel-air mixture fed to the first cylinder group 2 is continuously reduced, and the amount of fuel-air mixture fed to the second cylinder group 3 is continuously increased, for such a time that the quantities of fuel-air mixture fed to the second cylinder group 3 is continuously increased, for such a time that the quantities of fuel-air mixture for both cylinder groups in control points F and G are of the same size, and the continuous reduction of the amount of fuel-air mixture fed to the first cylinder group 2 takes place to a lesser extent than the continuous increase of the amount of fuel-air mixture fed to the second cylinder group 3.

From control point F, the cam disk 45 slides, on the one hand, with its cam path 46 along the control lever 47 of the first cylinder group 2 up to a control point H and, on the other hand, with its cam path 46 along the control lever 48 of the second cylinder group 3 up to a control point K arranged with control point H on a common control plane 61 extending through the axis of rotation 62 of the cam disk 45 and, just as control point H, symbolizing the full load of the internal combustion engine, the cam control configurations between points F, G and H, K, respectively, are shaped to cause the amounts of fuel-air mixture for both cylinder groups to be continuously increased to the same extent.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims:

We claim:

1. A multicylinder internal combustion engine for motor vehicles comprising first and second cylinder groups, each group having a fuel-air mixture feed device associated therewith that is adjustable as a function of the load of the internal combustion engine, means for causing a fuel-air mixture to be fed to the first group of cylinders and air to be supplied to the second cylinder group during idling of the internal combustion engine and means for causing, from idling up to the end of a predetermined partial load range of the internal combustion engine, the amount of fuel-air mixture fed to the first group of cylinders to be continuously increased and the amount of air fed to the second group of cylinders to be continuously increased in a first part of this partial load range and continuously diminished to an amount that is practically zero in a subsequent remaining part of the partial load range.

2. A multicylinder internal combustion engine as in claim 1 further comprising an exhaust treatment conduit system in which first and second catalyzers are disposed with the first catalyzer being upstream, in the direction of exhaust flow, relative to the second catalyzer, first conduit means for causing exhaust gases of the first cylinder group to impinge on both catalyzers and second conduit means for causing exhaust gases of the second cylinder group to enter the exhaust treatment conduit system upstream of the second catalyzer, a first oxygen measuring sensor positioned in said treatment conduit system upstream of the first catalyzer, and a second oxygen measuring sensor positioned in said treatment conduit system upstream of the second catalyzer and downstream of the entry of exhaust gases from the second cylinder group.

3. A multicylinder internal combustion engine as in claim 1, wherein the first conduit means comprises exhaust pipes associated with the cylinders of the first cylinder group which are combined upstream of the first oxygen measuring sensor to form one single pipe and the second conduit means comprises exhaust pipes associated with the cylinders of the second cylinder group which are combined to form a single exhaust pipe upstream of the second oxygen measuring sensor.

4. A multicylinder internal combustion engine as in claim 1, comprising means for causing a fuel-air mixture to also be supplied to the second cylinder group after the predetermined partial load range of the internal combustion engine is exceeded.

5. A multicylinder internal combustion engine as in claim 1, comprising means for causing the amount of fuel-air mixture delivered to the first group of cylinders to be continuously reduced, and the amount of fuel-air mixture delivered to the second cylinder group to be continuously increased, until the quantities of fuel-air mixture for the two groups of cylinders are the same and thereafter continuously increasing the fuel-air mixture for the two cylinder groups by the same amount, up to full load, after said partial load range is exceeded.

6. A multicylinder internal combustion engine as in claim 5, wherein the means for causing the continuous reduction of the amount of fuel-air mixture delivered to the first group of cylinders is operable to cause the decrease of fuel-air mixture to the first cylinder group to be of a lesser degree than the continuous increase of the fuel air mixture delivered to the second group of cylinders after the partial load range is exceeded.

7. A multicylinder engine according to any one of claims 1 or 4 or 5 or 6, wherein the means for causing comprise portions of a rotary cam means, said cam means being connected to a gas pedal cable so as to be rotated thereby, and wherein said cam means engages a throttle air valve shifting member for each of the cylinder groups.

8. A multicylinder internal combustion engine for automobiles comprising first and second cylinder groups, each group having fuel-air mixture feeding devices associated therewith, said first cylinder group being fed by its associated fuel-air mixture device during all operating ranges and said second cylinder groups being fed by its associated fuel-air mixture device only after a predetermined partial load range is exceeded, an air supply throttle valve arranged in an intake manifold associated with each group, and gas pedal responsive cam means for adjusting the degree of opening of the throttle valve of both cylinder groups, said cam means comprising:

(a) an engine idling control configuration arranged to cause the throttle valve of the first cylinder group to be held in a closed position and simultaneously said second cylinder group throttle valve to be held open to a minor extent;

(b) a first partial load control configuration arranged to cause both of said throttle valves to progressively open;

(c) a second partial load control configuration arranged to progressively close the throttle valve of the second cylinder group while continuing to progressively open the throttle valve associated with the first cylinder group;

(d) a third partial load control configuration arranged for progressively closing the throttle valve associated with the first cylinder group while progressively opening the throttle valve associated with second cylinder group;

(e) a feeding device actuating configuration disposed for turning on the feeding device associated with the second cylinder group during a transfer from said second to said third partial load configurations; and (f) a full load control configuration arranged for bringing said throttle valves from an equal degree of opening to fully open positions at the same continuously opening rate.

9. A multicylinder internal combustion engine according to claim 8, wherein said cam means comprises a cam disk, and said throttle valves each have a pivot lever engageable with said partial and full load configurations.

10. A multicylinder internal combustion engine according to claims 8 or 9, wherein the fuel-air mixture feeding means are electromagnetically operable fuel injection valves and wherein the fuel-air mixture means associated with the second cylinder group is provided with actuating switch means engageable with a control cam forming said feeding device actuating configuration.

11. A multicylinder internal combuation engine according to claim 8, comprising an exhaust threatment conduit system in which first and second catalyzers are disposed, conduit means forming part of said system for directing exhaust gases from said first cylinder group through both of said catalyzers and exhaust gases from said second cylinder group through only said second catalyzer, and an oxygen sensor positioned at an end of each of said catalyzers that is located upstream in the direction of exhaust gas flow.

12. A method of operating a multicylinder internal combustion engine for automotive vehicles, having a fuel-air mixture feeding means associated with two different cylinder groups and electromagnetically operable fuel injection valves, comprising feeding a fuel-air mixture to the first cylinder group in all operating ranges of the internal combustion engine and, in dependence on the position of the gas pedal, feeding only air to the second cylinder group from idling up to the end of a predetermined partial load range of the internal combustion engine and a fuel-air mixture to the second cylinder group from the end of the predetermined partial load range up to the full load condition of the internal combustion engine, and controlling the air supplied to each cylinder group with a throttle valve arranged in an intake manifold, the position of the throttle valve being varied by a gas pedal actuated cam disk, by way of control levers arranged on throttle valve shafts for rotation therewith and cooperating with configurations of the cam disk, and wherein the following control operations are performed:

during idling of the internal combustion engine, the control lever of the first cylinder group is held in contact with a first control point (A) on the cam disk, whereby the first cylinder group throttle valve is closed, and air is fed to the first cylinder group via an idling adjustment means for the idling fuel-air mixture, and the control lever of the second cylinder group is held in contact with a second control point (B) on the cam disk, whereby the throttle valve is opened to a minor extent, so that air is fed to the second cylinder group with the fuel feed means being shut off;

at the end of a predetermined partial load range of the internal combustion engine, the control lever of the first cylinder group is, on the one hand, in contact with a third control point (C) on the cam disk, the amount of fuel-air mixture fed to the first cylinder group being continuously increased up to this control point and, on the other hand, the control lever of the second cylinder group is initially in contact with a fourth control point (D) on the cam disk symbolizing the end of a first part of the predetermined partial load range, up to which point the amount of air fed to the second cylinder group is continuously increased, and is thereafter in contact with a fifth control point (E) symbolizing the end of the predetermined partial load range, up to which point the amount of air is continuously reduced to an air quantity approximating zero;

a control cam arranged at the cam disk, actuating a switch upon reaching the third and fifth control points (C and E), said third and fifth points being arranged on a common control plane extending through an axis of rotation of the cam disk, by means of which switch the fuel injection nozzles for the second cylinder group are placed in operation;

above the predetermined partial load range, the control lever of the first cylinder group being brought into contact, on the one hand, with a sixth control point (F) on the cam disk and, on the other hand, the control lever of the second cylinder group is in contact with a seventh control point (G) arranged on a plane extending through the axis of rotation of the cam disk, wherein the amount of fuel-air mixture fed to the first cylinder group up to these control points is continuously reduced, and the amount of fuel-air mixture fed to the first cylinder group is continuously increased, until the amounts of fuel-air mixture for both cylinder groups are of equal size at the sixth and seventh control points (F and G), the continuous reduction of the amount of fuel-air mixture fed to the first cylinder group being effected to a lesser extent than the continuous increase of the amount of fuel-air mixture fed to the second cylinder group; and during the full-load range of the internal combustion engine, the control lever of the first cylinder group is in contact with an eight control point (H) on the cam disk, and the control lever of the second cylinder group is in contact with a ninth control point (K) on the cam disk arranged with the control point (H) on a common control plane extending through the axis of rotation of the cam disk, wherein the amount of fuel-air mixture for both cylinder groups are continuously increased to the same extent by movement of the control levers between the sixth and eighth, and seventh and ninth control points, respectively.

13. A method according to claim 12, wherein exhaust gases produced by said first cylinder group are fed to a first and second catalyzer, said first catalyzer being located upstream of said second catalyzer, and wherein exhaust gases produced by said second cylinder group are fed only to said second catalyzer.

* * * * *

UNITED STATES PATENT AND TRADEMARK OFFICE
CERTIFICATE OF CORRECTION

PATENT NO. : 4,305,249
DATED : December 15, 1981
INVENTOR(S) : Wolfgang SCHMID, Klaus SCHELLMANN It is certified that error appears in the above—identified patent and that said Letters Patent is hereby corrected as shown below:

[30] Foreign Application Priority Data should read:

-- March 1, 1979 [DE] Fed. Rep. of Germany ...2907934 --.

Signed and Sealed this

Third Day of April 1984

[SEAL]

Attest:

GERALD J. MOSSINGHOFF

Attesting Officer    Commissioner of Patents and Trademarks